United States Patent [19]
Tamai et al.

[11] Patent Number: 5,904,728
[45] Date of Patent: May 18, 1999

[54] VOICE GUIDANCE TIMING IN A VEHICLE NAVIGATION SYSTEM

[75] Inventors: Haruhisa Tamai, Saitama, Japan; Satish Pai, Sunnyvale, Calif.

[73] Assignee: Visteon Technologies, LLC, Dearborn, Mich.

[21] Appl. No.: 08/731,371

[22] Filed: Oct. 11, 1996

[51] Int. Cl.$^6$ .................................................. G06F 165/00
[52] U.S. Cl. .......................... 701/211; 701/209; 340/990; 340/995
[58] Field of Search ..................................... 701/200, 207, 701/208, 209, 211; 73/178 R; 340/988, 990, 995

[56] References Cited

U.S. PATENT DOCUMENTS

| | | |
|---|---|---|
| 3,845,289 | 10/1974 | French . |
| 4,570,227 | 2/1986 | Tachi et al. . |
| 4,608,656 | 8/1986 | Tanaka et al. . |
| 4,611,293 | 9/1986 | Hatch et al. . |
| 4,672,565 | 6/1987 | Kuno et al. . |
| 4,673,878 | 6/1987 | Tsushima et al. . |
| 4,723,218 | 2/1988 | Hasebe et al. . |
| 4,734,863 | 3/1988 | Honey et al. . |
| 4,751,512 | 6/1988 | Longaker . |
| 4,782,447 | 11/1988 | Ueno et al. . |
| 4,796,191 | 1/1989 | Honey et al. . |
| 4,797,841 | 1/1989 | Hatch . |
| 4,831,563 | 5/1989 | Ando et al. . |
| 4,862,398 | 8/1989 | Shimizu et al. . |
| 4,882,696 | 11/1989 | Nimura et al. ........................... 701/211 |
| 4,914,605 | 4/1990 | Loughmiller, Jr. et al. . |
| 4,918,609 | 4/1990 | Yamawaki . |
| 4,926,336 | 5/1990 | Yamada . |
| 4,937,753 | 6/1990 | Yamada . |
| 4,964,052 | 10/1990 | Ohe . |
| 4,970,652 | 11/1990 | Nagashima . |
| 4,982,332 | 1/1991 | Saito et al. . |
| 4,984,168 | 1/1991 | Neukrichner et al. . |
| 4,989,151 | 1/1991 | Nuimura . |
| 4,992,947 | 2/1991 | Nuimura et al. . |
| 4,996,645 | 2/1991 | Schneyderberg Von der Zon . |
| 4,999,783 | 3/1991 | Tenmoku et al. . |
| 5,040,122 | 8/1991 | Neukirchner et al. . |
| 5,046,011 | 9/1991 | Kakihara et al. . |
| 5,060,162 | 10/1991 | Ueyama et al. . |
| 5,177,685 | 1/1993 | Davis et al. . |
| 5,184,123 | 2/1993 | Bremer et al. ........................... 701/211 |
| 5,283,743 | 2/1994 | Odagawa . |
| 5,287,297 | 2/1994 | Ihara et al. . |
| 5,297,050 | 3/1994 | Ichimura et al. . |
| 5,410,486 | 4/1995 | Kishi et al. ............................... 701/211 |
| 5,444,629 | 8/1995 | Kishi et al. ............................... 701/211 |
| 5,463,554 | 10/1995 | Araki et al. ............................... 701/211 |
| 5,729,109 | 3/1998 | Kaneko et al. .......................... 701/211 |
| 5,737,225 | 4/1998 | Schulte .................................... 701/211 |
| 5,774,071 | 6/1998 | Konishi et al. .......................... 701/211 |
| 5,790,973 | 8/1998 | Blaker et al. ............................. 340/995 |

OTHER PUBLICATIONS

French, R.L., "Map Matching Origins Approaches and Applications" Robert L. French & Associates, 3815 Lisbon St., Suite 201, Fort Worth, TX 76107, USA, pp. 91–116.

*Primary Examiner*—Gary Chin
*Attorney, Agent, or Firm*—Joseph M. Villeneuve; Beyer & Weaver, LLP

[57] ABSTRACT

A method and apparatus are provided for providing route guidance to a user of a vehicle navigation system. A route is generated which corresponds to a plurality of maneuvers. A warning distance is determined from a particular geographic location associated with a particular maneuver, the warning distance being based in part on a variable parameter. A maneuver instruction corresponding to the particular maneuver is then provided at the warning distance from the particular geographic location. In some embodiments, where the particular maneuver corresponds to a first junction, and a second junction similar to the first junction is within the warning distance, the warning distance is adjusted to an adjusted warning distance.

14 Claims, 4 Drawing Sheets

VOICE GUIDANCE TIMING IN A VEHICLE NAVIGATION SYSTEM

BACKGROUND OF THE INVENTION

The present invention relates to the manner in which a vehicle navigation system communicates a calculated route to a driver. More specifically, the present invention relates to the timing of warning prompts which alert the driver to upcoming maneuvers.

Vehicle navigations systems employ a variety of methods for communicating a route to a driver. One method employs warning chimes to alert the driver to an upcoming maneuver. Another employs a series of voice prompts. The timing of these chimes or voice prompts are crucial to effective route guidance. If a prompt is delayed, the driver may not be able to execute the maneuver in a safe and orderly manner. If a prompt is issued too early and a significant amount of time elapses before the vehicle arrives at the maneuver location, the driver may not be properly alert.

Currently available vehicle navigation systems which have warning chimes or voice guidance typically employ a fixed distance at which the driver is warned of an upcoming maneuver. That is, once the vehicle is determined to be within a particular distance of the geographic location at which the maneuver is to be executed, the system issues the warning chime or the voice guidance prompt. Unfortunately, this method does not account for the often widely varying characteristics of the environment in which the vehicle is operating. For example, if the fixed warning distance is set to provide adequate notice to the driver in a freeway environment where the speed limit is 65 miles per hour, it will likely be too long for a residential area where the speed limit is typically 25 miles per hour.

Moreover, a fixed warning distance may cause confusion by encompassing more than one junction at which similar maneuvers may be executed. This will almost certainly be the case where the fixed warning distance is set relative to a freeway environment. Because such a warning distance would be relatively long, it would likely encompass more than one intersection in a different environment where the average vehicle speed is considerably less such as, for example, a residential environment. Such confusion is unacceptable if a vehicle navigation system is to adequately guide the driver along a calculated route.

It is therefore evident that a more flexible approach is needed for communicating warnings of impending maneuvers to the user of a vehicle navigation system.

SUMMARY OF THE INVENTION

The present invention provides a vehicle navigation system which communicates warnings of upcoming maneuvers in a manner which takes into account the conditions under which the vehicle is operating, thereby providing a flexible alternative to previous systems. Once a route has been calculated, each maneuver in the route is communicated to the driver at a warning distance which may be varied according to a variety of factors. According to one embodiment, the system calculates a warning distance based in part on the current speed of the vehicle. As a result, the warning distance more closely resembles the actual distance required for the driver to react to the maneuver instruction in a timely and safe manner.

According to another embodiment, the system determines the link class of the road upon which the vehicle is currently traveling and selects a warning distance associated with the determined link class. Because the link class of a road corresponds roughly to the speed at which one travels on the road, this method has an effect on the warning distance which is similar to that described above.

According to some embodiments, the present invention adds another level of flexibility to deal with situations in which road junctions having similar geometries are closely spaced and are likely to cause confusion as to which junction a particular warning prompt refers. Once the system determines a warning distance for a particular upcoming maneuver, it then determines whether there are any junctions within the warning distance in advance of the maneuver junction which present a similar geometry, i.e., any junction which could be mistaken for the maneuver junction. If such a junction is found, the warning distance is adjusted to be less than or equal to the distance between the similar junction and the maneuver junction. In a specific embodiment the warning distance is set such that the warning is issued immediately after the vehicle passes the similar junction, thereby avoiding any confusion.

Thus, according to the invention, a method and apparatus are provided for providing route guidance to a user of a vehicle navigation system. A route is generated which corresponds to a plurality of maneuvers. A warning distance is determined from a particular geographic location associated with a particular maneuver, the warning distance being based in part on a variable parameter. A maneuver instruction corresponding to the particular maneuver is then provided at the warning distance from the particular geographic location.

According to one embodiment, the variable parameter is vehicle speed. According to another, the variable parameter is road segment link class. In some embodiments, where the particular maneuver corresponds to a first junction having a first characteristic, and a second junction having the first characteristic is within the warning distance, the warning distance is adjusted to an adjusted warning distance. According to a more specific embodiment, the distance between the first and second junctions is defined as the first distance and the adjusted warning distance is set to the first distance where the first distance is greater than or equal to the minimum limit. Where the first distance is less than the minimum limit, the adjusted warning distance is set to the minimum limit.

A further understanding of the nature and advantages of the present invention may be realized by reference to the remaining portions of the specification and the drawings.

DESCRIPTION OF THE PREFERRED EMBODIMENT

The present invention relates generally to commonly assigned U.S. Pat. No. 5,345,382 to Kao for CALIBRA- TION METHOD FOR A RELATIVE HEADING SENSOR, U.S. Pat. No. 5,359,529 to Snider for ROUTE GUIDANCE ON/OFF-ROUTE STATE FILTER, U.S. Pat. No. 5,374,933 to Kao for POSITION CORRECTION METHOD FOR VEHICLE NAVIGATION SYSTEM, and U.S. Pat. No. 5,515,283 to Desai et al. for METHOD FOR IDENTIFYING HIGHWAY ACCESS RAMPS FOR ROUTE CALCULATION IN A VEHICLE NAVIGATION SYSTEM, the entire specifications of which are incorporated herein by reference.

Figure 1:
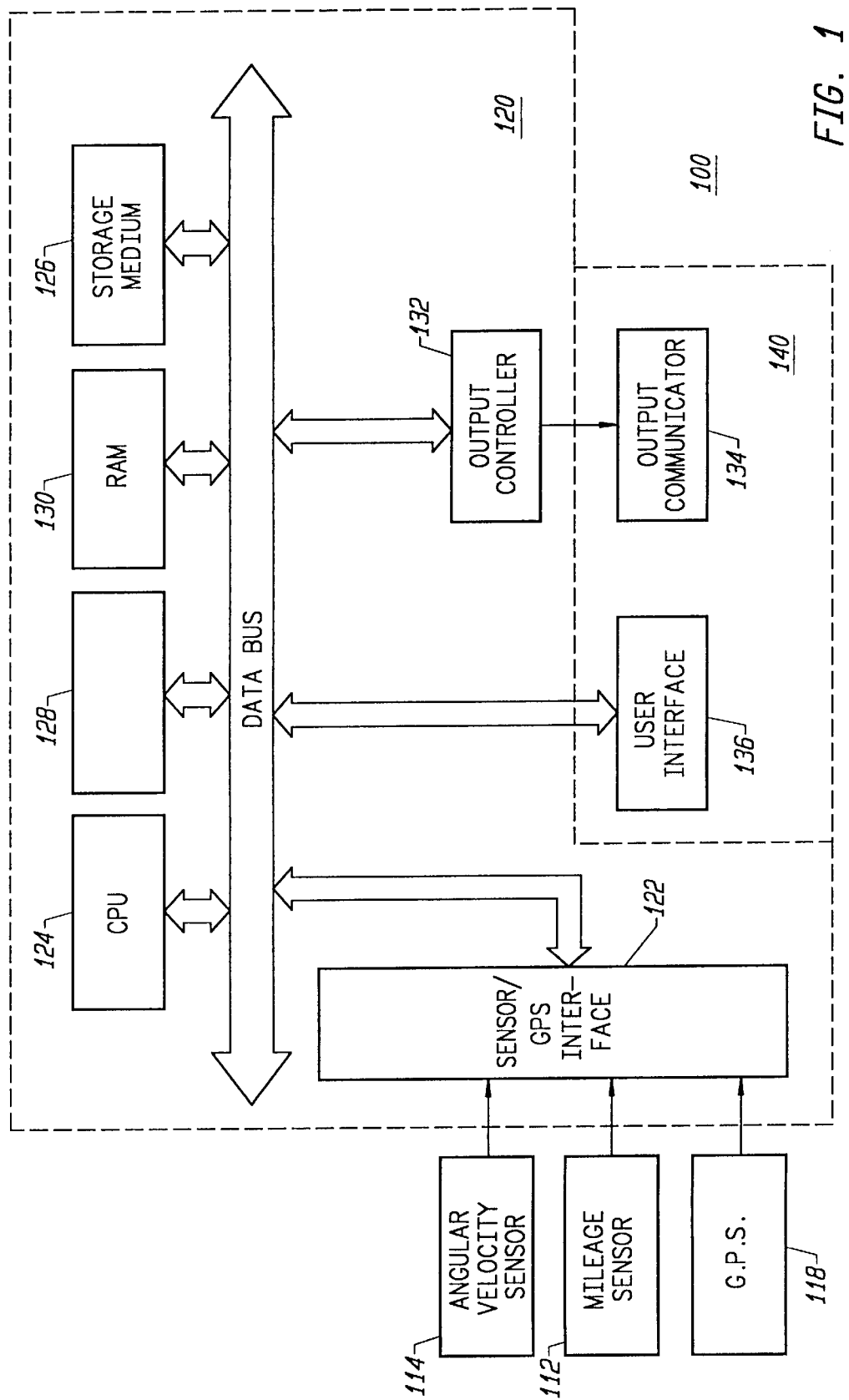
FIG. 1 is a block diagram of a vehicle navigation system for use with the present invention.

FIG. 1 is a block diagram of a specific embodiment of a vehicle navigation system 100 for use with the present invention. Sensors 112 and 114 and GPS receiver 118 are coupled to computing means 120 through sensor/GPS interface 122. In typical embodiments, mileage sensor 112 comprises an odometer, and angular velocity sensor 114 comprises a gyroscope, or a differential odometer coupled to the wheels of the vehicle. A global positioning system (GPS) data receiver 118 is provided for receiving signals from, for example, a satellite-based navigation system. Data from sensor/GPS interface 122 is transmitted to CPU 124, which performs calibration, signal processing, dead-reckoning, vehicle positioning, and route guidance functions. A database containing map information may be stored in database medium 126, with software directing the operation of computing means 120 stored in main memory 128 for execution by CPU 124. Memory 128 may comprise read-only memory (ROM), or reprogrammable non-volatile memory such as flash memory or SRAM. System RAM 130 permits reading and writing of the information necessary to execute such software programs. Database medium 126 may comprise non-volatile memory, a hard disk drive, CD-ROM, or an integrated circuit in which digitized map information has been stored. Output controller 132, which may comprise a graphics controller, receives data processed by CPU 124 and transmits the data to display console 140 which includes output communicator 134, usually comprising a display screen with associated audio electronics and audio speakers. The driver may input data, such as a desired destination, through user interface 136, typically comprising a keyboard.

The map database stored in database medium 126 preferably comprises positional data such as, for example, latitude and longitude coordinates, to describe road intersections or nodes, road segments, landmarks and points of interest, and other geographical information. The data base may further comprise data representing characteristics of roads or places on the map, such as road and place names, road features such as dividers, one-way restrictions, surface, speed limit, shape, elevation, and other properties. According to specific embodiments of the invention, the map database includes cost values associated with individual nodes and road segments. These cost values correspond to the estimates of time intervals for traversing the respective node or segment. Node cost values take into consideration such information as, for example, whether the vehicle would encounter oncoming traffic, thus delaying a left turn maneuver. Segment costs reflect road segment characteristics such as speed limit and segment length, both of which affect the travel time along the segment. Also associated with each road in the map database is a link class which relates to the category or type of the road. For example, the highest level category of the hierarchy is the link class FREEWAY. The lowest level includes the link classes FRONTAGE and MISC which include, for example, frontage roads and alleys.

The vehicle navigation system of the present invention is operable to generate a route from a source location to a destination according to a variety of different methods. Some examples of such methods are described in the U.S. patents which are incorporated by reference into the present specification above. In addition, further methods for route generation may be employed in conjunction with the present invention.

Once a route has been generated according to any of a variety of methods, the system begins to communicate maneuver instructions to the driver. Each maneuver instruction is communicated at a variable warning distance in advance of the location of the upcoming maneuver. The warning distance may be determined according to different embodiments of the invention. According to one method, the warning distance for a particular maneuver instruction is set according to the link class associated with the road on which the vehicle is traveling as it approaches the corresponding maneuver. For example, Table 1 shows warning distances for different link classes according to a specific embodiment of the invention.

TABLE 1

Warning distance table

| Road Segment Link Class | Warning distance (ft.) |
| --- | --- |
| Freeway | 2112 |
| Expressway | 1214 |
| Artery | 1003 |
| Street | 792 |
| Frontage | 528 |
| Ramp | 1214 |
| Connector | 528 |
| Miscellaneous | 528 |
| Access | 528 |

According to another method, the warning distance for a particular maneuver instruction is determined in part with reference to the current speed of the vehicle. In a specific embodiment, the warning distance is given by:

$$d_w = d_{max}; \quad v_a > v_{max} \quad (1)$$

$$d_w = d_{min} + [(d_{max} - d_{min}) \cdot (v_a - v_{min})]/(v_{max} - v_{min}); \quad v_{max} \geq v_a \geq v_{min} \quad (2)$$

$$d_w = d_{min}; \quad v_a < v_{min} \quad (3)$$

where $d_w$ is the warning distance;

$d_{min}$ is the minimum limit;

$d_{max}$ is the maximum limit;

$v_a$ is the current vehicle speed;

$v_{min}$ is a minimum speed below which the warning distance is the minimum limit; and $v_{max}$ is a maximum speed above which the warning distance is the maximum limit.

Figure 2:
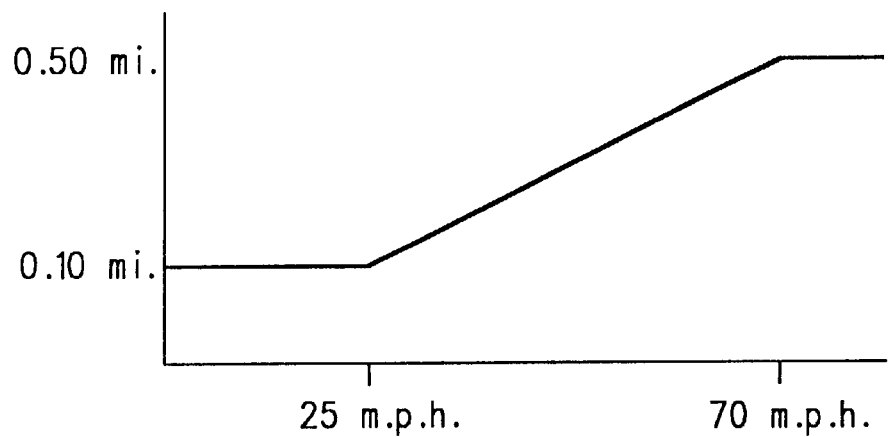
FIG. 2 is a graph of warning distance vs. vehicle speed according to a particular embodiment of the invention.

In various specific embodiments $d_{min}$ is 528 feet, $d_{max}$ is 2640 feet, $v_{min}$ is 25 miles per hour, and $v_{max}$ is 70 miles per hour. Using these numbers, equations (1)–(3) may be plotted as shown in FIG. 2 with the horizontal axis representing vehicle speed and the vertical axis representing warning distance. As shown, below 25 mph the warning distance is constant at 0.1 miles (528 feet). Between 25 and 70 mph the warning distance varies according to equation (2). Finally, above 70 mph the warning distance is constant at 0.5 miles (2,640 feet).

Some embodiments also include a feature which sounds a chime after the maneuver instruction has been given at the warning distance to alert the driver that she must execute the maneuver almost immediately. The location at which the chime sounds may be set at a fixed distance from the maneuver location, e.g., 300 feet. Alternatively, the chime distance may vary in a manner similar to the warning distance.

Figure 3:
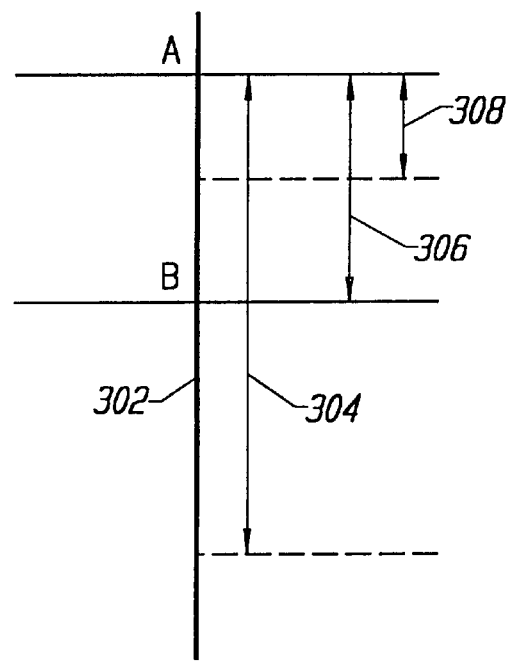
FIG. 3 illustrates a specific embodiment of the invention.

As mentioned above, even where the warning distance to a maneuver junction has been determined with reference to the environment in which the vehicle is operating, confusion may yet arise because one or more junctions with similar geometries lie within the warning distance. Such a situation is illustrated by the diagram of FIG. 3. As the driver proceeds along road 302 toward the next maneuver, i.e., a right turn at location A, the system determines an original warning distance 304 according to one of the embodiments of the invention described above. If, however, the system determines that another junction exists within warning distance 304 at which the driver may also execute a right turn, i.e., location B, the warning distance is adjusted to the distance between location B and location A, i.e., distance 306. The system also sounds a chime at distance 308 where the vehicle is nearly on top of the maneuver. According to a more specific embodiment, if the adjusted warning distance would be less than a minimum warning distance, the warning distance is set to the minimum warning distance. In an even more specific embodiment, each link class has a minimum warning distance associated therewith.

Alternatively, where the system detects an intermediate junction such as location B, the originally determined warning distance is retained, but the substance of the warning is changed. Thus, for example, if the warning was originally to state "Turn right at next intersection", it is changed to state "Turn right at second intersection".

Figure 4:
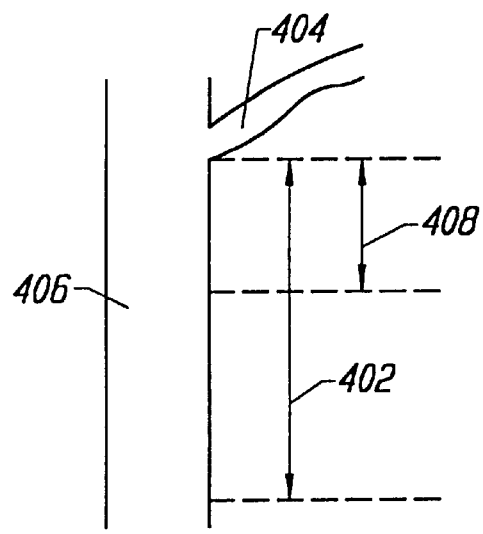
FIG. 4 illustrates another specific embodiment of the invention.

Another warning feature is provided in some embodiments to give the driver additional advance notice of an upcoming maneuver. In freeway environments, drivers must often traverse several lanes of traffic moving at high speeds to exit. Because the distance required to execute such a maneuver typically depends upon more than just the vehicle's speed, an additional voice prompt is provided which allows the driver to begin changing lanes well in advance of the desired exit. FIG. 4 shows a pre-warning distance 402 from an exit 404 on a freeway 406 at which the driver is provided with a voice prompt stating "Prepare to exit". Subsequently, at a warning distance 408 from exit 404, the driver receives the maneuver instruction "Next exit on the right". Pre-warning distance 402 may be set in a variety of ways. According to one embodiment it comprises some multiple of warning distance 408. According to another embodiment, each link class has a fixed pre-warning distance associated therewith.

Figure 5:
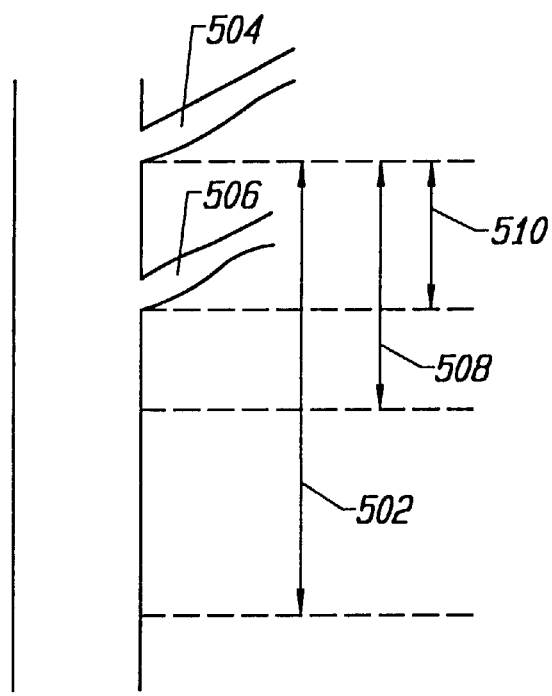
FIG. 5 illustrates still another embodiment of the invention.

FIG. 5 shows a situation in which a pre-warning is issued at a distance 502 from a desired exit 504 and a similar exit 506 precedes exit 504. As with the example of FIG. 4, a warning distance 508 is determined. However, because the system detects the existence of exit 506, the warning distance is adjusted to a new warning distance 510 at which location a warning is issued stating "Next exit on the right".

Figure 6:
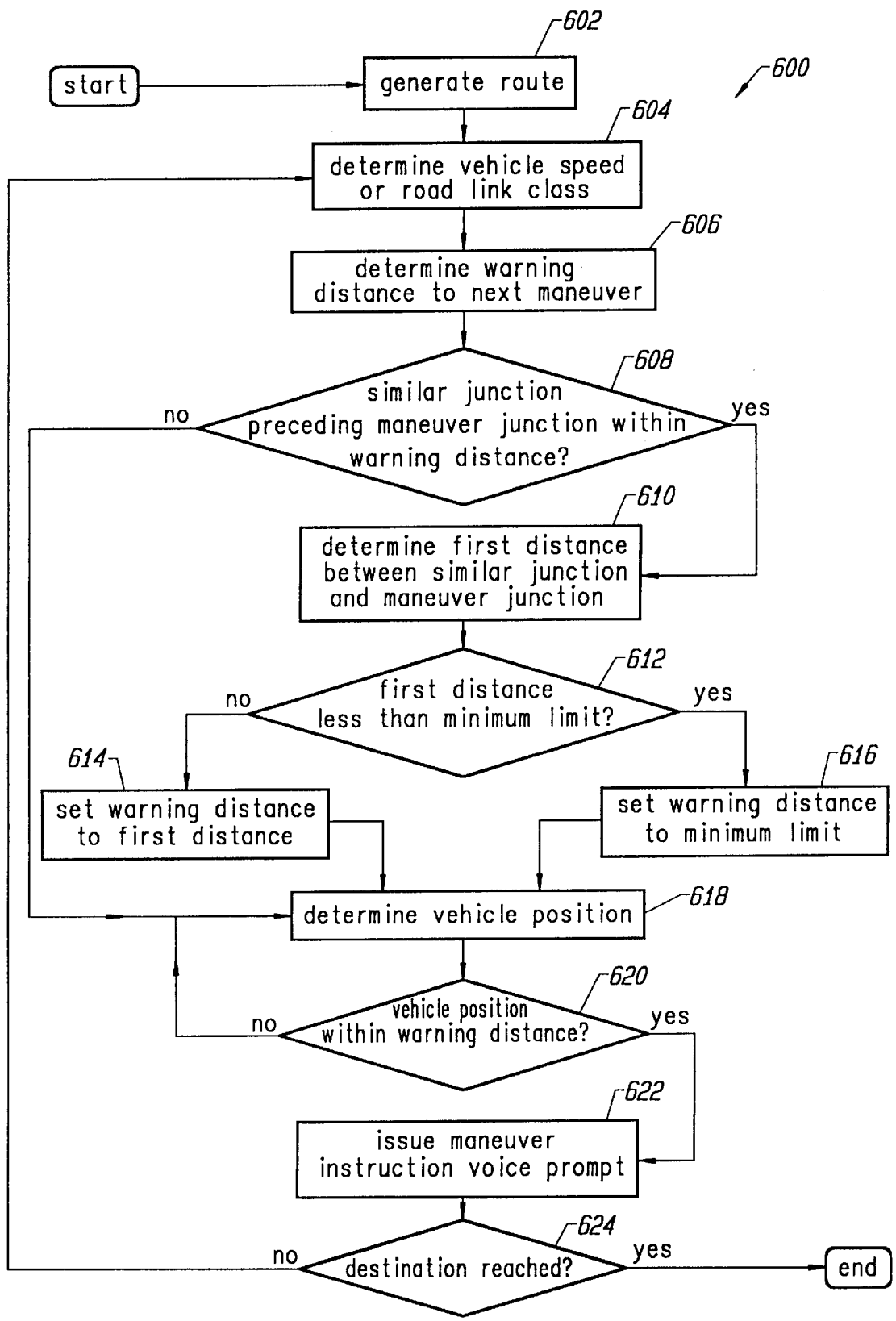
FIG. 6 is a flowchart which illustrates the operation of a particular embodiment of the present invention.

FIG. 6 is a flowchart 600 which illustrates the operation of a particular embodiment of the present invention. Initially, a route between a source location and a destination is generated according to any of a variety of methods (step 602). The route comprises a plurality of contiguous road segments and a plurality of maneuvers to be executed by the driver. The maneuvers are sequentially communicated to the driver via a display console and audio speakers. Between maneuvers, the system determines at what point to communicate the next maneuver to the driver. To facilitate this determination, the system either determines the current speed of the vehicle and/or the link class of the road on which the vehicle is currently traveling (step 604). The warning distance is then determined (step 606) using the vehicle speed or the link class depending upon which of the above-described embodiments are employed.

The system then determines whether there is a junction within the warning distance which is similar to the maneuver junction (step 608). If such a junction exists, the system determines the distance between the two junctions, i.e., the first distance, (step 610), and whether the first distance is less than a minimum limit (step 612). The minimum limit may be a fixed value, or may vary according to the current link class. If the first distance is greater than or equal to the minimum limit, the warning distance is set to the first distance (step 614). If, however, the first distance is less than the minimum limit, the warning distance is set to the minimum limit (step 616).

The system then determines the current position of the vehicle (step 618). If no intermediate junction is found in step 608, the system moves directly to step 618. The system then determines whether the current vehicle position is within the warning distance (step 620). If not, the system continues to update the vehicle position until it is. If the current vehicle position is within the warning distance, the system issues a maneuver instruction voice prompt to the driver (step 622). If the destination has been reached (step 624), the procedure ends. If not, the system repeats the procedure with reference to the next maneuver.

While the invention has been particularly shown and described with reference to specific embodiments thereof, it will be understood by those skilled in the art that the foregoing and other changes in the form and details may be made therein without departing from the spirit or scope of the invention. For example, the invention has been described primarily with regard to the timing of voice guidance prompts. However, it will be understood that the present invention may easily be applied to the timing of warning chimes. The scope of the invention should therefore be determined by reference to the appended claims.

What is claimed is:

1. A method for providing route guidance to a user of a vehicle navigation system, comprising the steps of:

generating a route which corresponds to a plurality of maneuvers;

calculating a warning distance from a particular geographic location associated with a particular maneuver, the warning distance being based in part on a vehicle speed; and providing a maneuver instruction corresponding to the particular maneuver at the warning distance from the particular geographic location;

wherein the warning distance has a minimum limit and a maximum limit and is calculated using the equations:

$d_w = d_{max}$, for $v_a > v_{max}$ $d_w = d_{min} + [(d_{max} - d_{min}) \cdot (v_a - v_{min})]/(v_{max} - v_{min})$, for $v_{max} \geq v_a \geq v_{min}$ $d_w = d_{min}$, for $v_a < v_{min}$ where $d_w$ is the warning distance;

$d_{min}$ is the minimum limit;

$d_{max}$ is the maximum limit;

$v_a$ is the vehicle speed;

$v_{min}$ is a minimum speed below which the warning distance is the minimum limit; and $v_{max}$ is a maximum speed above which the warning distance is the maximum limit.

2. A method for providing route guidance to a user of a vehicle navigation system, comprising the steps of:

generating a route which corresponds to a plurality of maneuvers;

determining a warning distance corresponding to a particular maneuver associated with a first junction, the first junction being characterized by a first geometry;

determining whether a second junction substantially characterized by the first geometry precedes the first junction within the warning distance;

where the second junction does not precede the first junction, providing a maneuver instruction corresponding to the particular maneuver at the warning distance from the first junction; and where the second junction precedes the first junction, providing the maneuver instruction at an adjusted warning distance from the first junction.

3. The method of claim 2 wherein the warning distance has a minimum limit, and the first and second junctions are separated by a first distance, the adjusted warning distance being set to the first distance where the first distance is greater than or equal to the minimum limit, and the adjusted warning distance being set to the minimum limit where the first distance is less than the minimum limit.

4. The method of claim 2 wherein the first and second providing steps comprise providing a voice prompt corresponding to the maneuver instruction.

5. The method of claim 2 wherein the first and second junctions are separated by a first distance, the adjusted warning distance determined with reference to the first distance.

6. The method of claim 2 wherein the warning distance is determined with reference to a variable parameter.

7. The method of claim 6 wherein the variable parameter comprises a vehicle speed.

8. The method of claim 7 wherein the warning distance has a minimum limit and a maximum limit and is calculated using the equations:

$$d_w = d_{max}, \text{ for } v_a > v_{max}$$

$$d_w = d_{min} + [(d_{max} - d_{min}) \cdot (v_a - v_{min})]/(v_{max} - v_{min}), \text{ for } v_{max} \geq v_a \geq v_{min}$$

$$d_w = d_{min}, \text{ for } v_a < v_{min}$$

where $d_w$ is the warning distance;

$d_{min}$ is the minimum limit;

$d_{max}$ is the maximum limit;

$v_a$ is the vehicle speed;

$v_{min}$ is a minimum speed below which the warning distance is the minimum limit; and $v_{max}$ is a maximum speed above which the warning distance is the maximum limit.

9. The method of claim 6 wherein the variable parameter comprises a road segment link class.

10. The method of claim 9 wherein determining the warning distance comprises selecting a value associated with a first link class.

11. A vehicle navigation system, comprising:

a plurality of sensors for detecting a current vehicle position, a vehicle heading, and vehicle motion, and generating signals indicative thereof;

a database medium having geographic locations of a plurality of road segments and junctions stored therein;

a processor coupled to the sensors and the database medium which is configured to:

generate a route which corresponds to a plurality of maneuvers;

determine a warning distance corresponding to a particular maneuver associated with a first junction, the first junction being characterized by a first geometry;

determine whether a second junction substantially characterized by the first geometry precedes the first junction within the warning distance;

where the second junction does not precede the first junction, provide a maneuver instruction corresponding to the particular maneuver at the warning distance from the first junction; and where the second junction precedes the first junction, provide the maneuver instruction at an adjusted warning distance from the first junction; and a user interface coupled to the processor for communicating the maneuver instruction to a user of the vehicle navigation system.

12. A computer program product for providing route guidance to a user of a vehicle navigation system, the computer program product comprising:

a computer-readable medium; and a computer program mechanism embedded in the computer-readable medium for causing a computer to perform the steps of:

generating a route which corresponds to a plurality of maneuvers;

determining a warning distance corresponding to a particular maneuver associated with a first junction, the first junction being characterized by a first geometry;

determining whether a second junction substantially characterized by the first geometry precedes the first junction within the warning distance;

where the second junction does not precede the first junction, providing a maneuver instruction corresponding to the particular maneuver at the warning distance from the first junction; and where the second junction precedes the first junction, providing the maneuver instruction at an adjusted warning distance from the first junction.

13. A vehicle navigation system, comprising:

a plurality of sensors for detecting a current vehicle position, a vehicle heading, and vehicle motion, and generating signals indicative thereof;

a database medium having geographic locations of a plurality of road segments and junctions stored therein;

a processor coupled to the sensors and the database medium which is configured to:

generate a route which corresponds to a plurality of maneuvers;

calculate a warning distance from a particular geographic location associated with a particular maneuver, the warning distance being based in part on a vehicle speed; and provide a maneuver instruction corresponding to the particular maneuver at the warning distance from the particular geographic location;

wherein the warning distance has a minimum limit and a maximum limit and is calculated using the equations:

$d_w = d_{max}$, for $v_a > v_{max}$ $d_w = d_{min} + [(d_{max} - d_{min}) \cdot (v_a - v_{min})]/(v_{max} - v_{min})$, for $v_{max} \geq v_a \geq v_{min}$ $d_w = d_{min}$, for $v_a < v_{min}$ where
- $d_w$ is the warning distance;
- $d_{min}$ is the minimum limit;
- $d_{max}$ is the maximum limit;
- $v_a$ is the vehicle speed;
- $v_{min}$ is a minimum speed below which the warning distance is the minimum limit; and
- $v_{max}$ is a maximum speed above which the warning distance is the maximum limit.

14. A computer program product for providing route guidance to a user of a vehicle navigation system, the computer program product comprising:

a computer-readable medium; and a computer program mechanism embedded in the computer-readable medium for causing a computer to perform the steps of:

generating a route which corresponds to a plurality of maneuvers;

calculating a warning distance from a particular geographic location associated with a particular maneuver, the warning distance being based in part on a vehicle speed; and providing a maneuver instruction corresponding to the particular maneuver at the warning distance from the particular geographic location;

wherein the warning distance has a minimum limit and a maximum limit and is calculated using the equations:

$d_w = d_{max}$, for $v_a > v_{max}$ $d_w = d_{min} + [(d_{max} - d_{min}) \cdot (v_a - v_{min})]/(v_{max} - v_{min})$, for $v_{max} \geq v_a \geq v_{min}$ $d_w = d_{min}$, for $v_a < v_{min}$ where
- $d_w$ is the warning distance;
- $d_{min}$ is the minimum limit;
- $d_{max}$ is the maximum limit;
- $v_a$ is the vehicle speed;
- $v_{min}$ is a minimum speed below which the warning distance is the minimum limit; and
- $v_{max}$ is a maximum speed above which the warning distance is the maximum limit.

* * * * *